United States Patent [19]
Monday et al.

[11] 3,882,014
[45] May 6, 1975

[54] REACTION ZONE EFFLUENTS SEPARATION AND HYDROGEN ENRICHMENT PROCESS

[75] Inventors: Richard D. Monday, Houston, Tex.; Norman H. Scott, Arlington Heights, Ill.

[73] Assignee: Universal Oil Products Company, Des Plaines, Ill.

[22] Filed: June 24, 1974

[21] Appl. No.: 482,304

Related U.S. Application Data

[63] Continuation-in-part of Ser. No. 301,009, Oct. 26, 1972, abandoned.

[52] U.S. Cl. ............... 208/134; 208/101; 208/102; 208/103; 208/104
[51] Int. Cl. ................................. C10g 35/04
[58] Field of Search .......... 208/134, 133, 102, 103, 208/104, 101, 111

[56] References Cited
UNITED STATES PATENTS

| | | | |
|---|---|---|---|
| 2,719,816 | 10/1955 | Rich, Jr. | 208/102 |
| 2,900,425 | 8/1939 | Bloch et al. | 260/666 |
| 3,000,812 | 9/1961 | Boyd, Jr. | 208/138 |
| 3,131,235 | 4/1964 | Asselin | 260/683.68 |
| 3,133,012 | 5/1964 | Berger | 208/95 |
| 3,254,018 | 5/1966 | Watkins | 208/59 |
| 3,296,118 | 1/1967 | Czajkowski | 208/100 |
| 3,322,842 | 5/1967 | Czajkowski et al. | 260/672 R |
| 3,376,217 | 4/1968 | DeGranger | 208/224 |
| 3,402,122 | 9/1968 | Atwater et al. | 208/101 |
| 3,472,758 | 10/1969 | Stine et al. | 208/59 |
| 3,520,799 | 7/1970 | Forbes | 208/101 |
| 3,718,575 | 2/1973 | Watkins | 208/59 |

Primary Examiner—Delbert E. Gantz
Assistant Examiner—Juanita M. Nelson
Attorney, Agent, or Firm—James R. Hoatson, Jr.; Robert W. Erickson; William H. Page, II

[57] ABSTRACT

A method for the separation of a hydrogen-containing hydrocarbonaceous reaction zone effluent accompanied by hydrogen enrichment of a recycled gaseous phase. The method involves the technique of cooling and partially condensing the effluent material emanating from a hydrocarbon reaction zone with introduction thereof into a vapor-liquid separation zone. A first vaporous phase is compressed and introduced upwardly into a contacting-condensation zone wherein the vapors countercurrently contact a descending stream of cooled fractionation zone liquid bottoms material. Partial condensation and selective absorption of the upwardly flowing vapors is effected with hydrogen enrichment of the vaporous phase withdrawn from the upper portion of the contacting-condensation zone. The liquid phases from the vapor-liquid separation zone and the contacting-condensation zone are admixed and introduced, at elevated pressure into a fractionation zone. A portion of the liquid bottoms material recovered from the fractionation zone is cooled and introduced into the contacting-condensation zone to contact countercurrently the upwardly flowing vapor phase therein.

7 Claims, 1 Drawing Figure

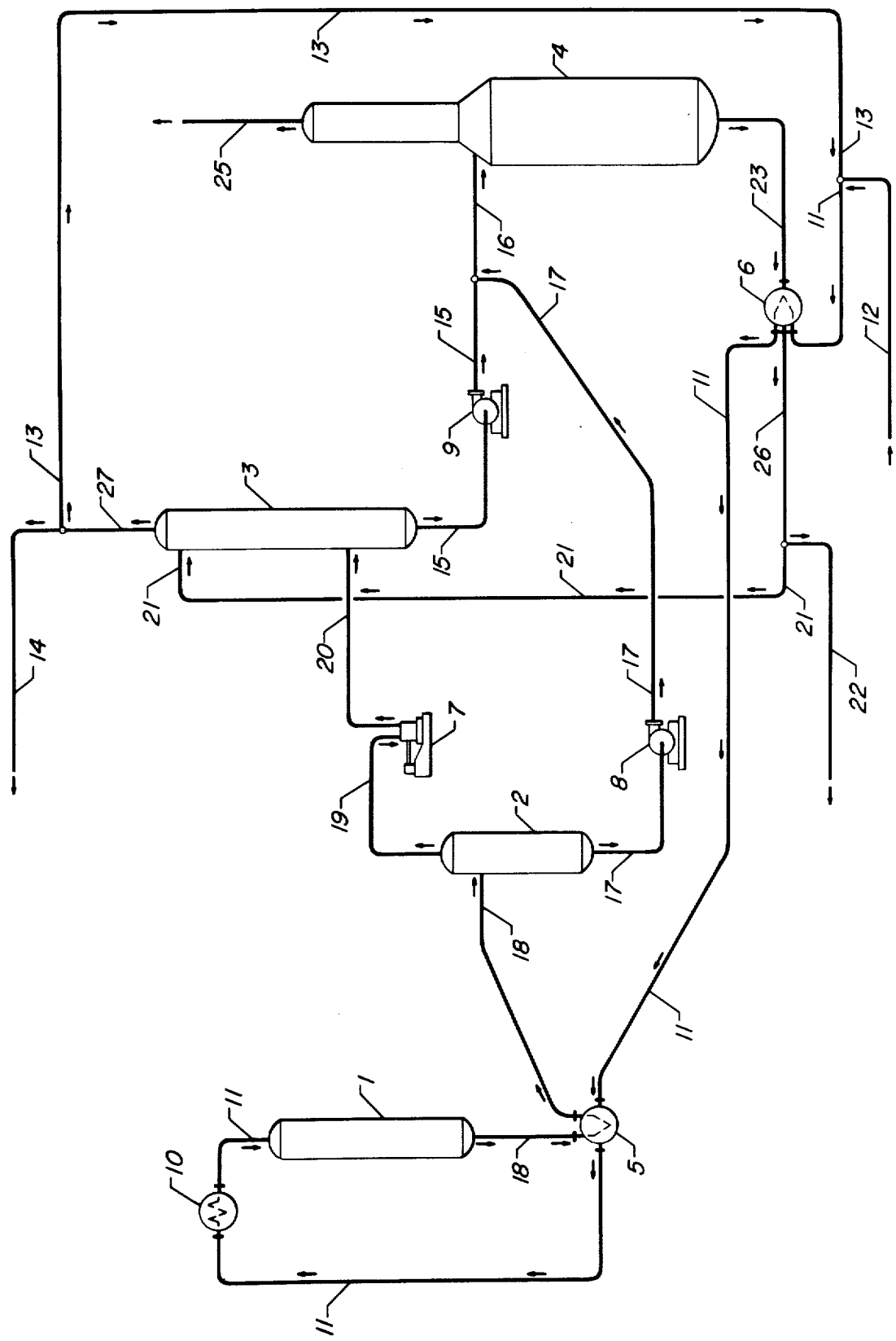

REACTION ZONE EFFLUENTS SEPARATION AND HYDROGEN ENRICHMENT PROCESS

RELATED APPLICATION

The present application is a continuation-in-part of our copending application Ser. No. 301,009, filed Oct. 26, 1972, now abandoned all the teachings of which copending application are incorporated herein by specific reference thereto.

APPLICABILITY OF INVENTION

The technique encompassed by the inventive concept herein described is generally applicable to processes for the catalytic conversion of hydrocarbons in a hydrogen-containing atmosphere. Such processes include the catalytic reforming of naphtha fractions to produce a relatively high octane liquid product, hydrocracking to produce lower molecular weight hydrocarbons, paraffinic dehydrogenation to produce olefinic hydrocarbons and hydrorefining for the purpose of contaminant removal, etc. Notwithstanding that these processes involve hydrogen-consuming reactions, hydrogen-producing reactions, or both, common practice dictates the utilization of a hydrogen-rich vaporous phase recycled to combine with the fresh charge to the reaction zone.

In processes for the catalytic conversion of a hydrocarbonaceous charge stock, the technique of recycling a hydrogen-rich vaporous phase, separated from the reaction zone effluent, is a common practice. Practical reasons for utilizing this technique reside in maintaining both the activity and operational stability of the catalytic composite used to effect the desired reactions. In hydrogen-producing processes, such as catalytic reforming, hydrogen in excess of that required for recycle purposes is recovered and utilized in other processes integrated into the overall refinery. For example, the excess from a catalytic reforming unit is often employed as the make-up hydrogen in a hydrocracking process wherein the reactions being effected are principally hydrogen-consuming. Regardless of the particular process, the recycled hydrogen is generally obtained by condensing the total reaction product effluent, say at a temperature in the range from about 60°F. to about 140°F., and introducing the thus-cooled effluent into a vapor-liquid separation zone. That portion of the recovered vaporous phase necessary to satisfy the hydrogen requirement within the reaction zone is recycled to combine with the hydrocarbon charge stock prior to the intoduction thereof into the reaction zone.

In accordance with the present invention, the reaction zone product effluent is only partially condensed by being cooled to a temperature not substantially lower than about 150°F., and preferably 200°F. The vaporous phase recovered from the thus-cooled mixture in the vapor-liquid separation zone is compressed and introduced upwardly into a contacting-condensing zone wherein it countercurrently contacts a cooled portion of liquid bottoms material recovered from a subsequent fractionation zone.

PRIOR ART

As hereinbefore stated, the prior art abounds with hydrocarbon conversion processes wherein a relatively hot reaction zone effluent is condensed and cooled to a temperature in the range of 60°F. to about 140°F., and introduced into a high pressure separator from which a hydrogen-rich vaporous phase and a normally liquid product phase are recovered. Generally, at least a portion of the vaporous phase is recycled, without further treatment, to combine with the charge stock prior to the introduction thereof into the reaction zone. In some situations, however, usually involving sulfur service, that portion of the vaporous phase to be recycled is treated to remove hydrogen sulfide.

Exemplary of the variety of processes which employ this basic technique is the pentane isomerization process disclosed in U.S. Pat. No. 3,131,325 (Cl. 260–683.68). Here, the total reaction zone effluent is cooled to about room temperature and separated to provide the hydrogen which is compressed and recycled. Similarly, U.S. Pat. No. 3,133,012 (Cl. 208–95) illustrates this technique as applied to a catalytic reforming system. In U.S. Pat. No. 3,718,575 (Cl. 208–59), which is directed toward a two-stage hydrocracking process for LPG production, the effluent from the second stage is cooled to a temperature of about 100°F. prior to introduction into the vapor-liquid separation zone; the hydrogen stream therefrom is recycled to the first stage to combine with the charge stock.

The above-described basic technique was improved upon by the schemes illustrated in U.S. Pat. Nos. 3,296,118 (Cl. 208–100) and 3,322,842 (Cl. 260–672). In the former, a portion of stabilized reformed naphtha is admixed with the reaction zone effluent prior to virtually total condensation and vapor-liquid separation to provide the recycle stream. In the latter, which is directed toward a hydrodealkylation process, the reaction product effluent is introduced first into a high pressure flash drum, the liquid phase from which is passed into a low pressure flash drum, from which liquid is admixed with the reaction zone effluent prior to its intoduction into the high pressure flash drum.

A somewhat varied technique is presented in U.S. Pat. No. 2,719,816 (Cl. 208–102), wherein the principal object involves separation and recovery of the net product streams. Aside from cooling the total product effluent to the extent that virtually complete condensation of normally liquid constituents is effected, accompanied by recycle of a portion of the vaporous phase, which technique is identical to these hereinabove described, the illustrated process concerns itself solely with treating the remaining product liquids and gases, including that portion of the separated vaporous phase not recycled to the reaction zone. That is, no portion of the recycled hydrogen stream is treated in any fashion, or by any method. The gist and substance of this product separation scheme is the introduction of uncondensed hydrocarbons (a stream comprising 86.4% $C_1$–$C_4$ hydrocarbons, on a mole basis), recovered from a stabilization zone, into the bottom of an absorption zone in order to lessen the quantity of absorber oil required therein.

In contrast to the foregoing described techniques, especially that of U.S. Pat. No. 2,719,816, and in accordance with the present method, the reaction zone effluent is only partially condensed — by cooling to a temperature not lower than about 150°F. — prior to intoduction into the initial vapor-liquid separation zone. The vaporous phase therefrom is then compressed to about the reaction zone pressure before being passed to a contacting-condensing zone for countercurrent contact therein with a cooled fractionation bottoms material. It is a portion of the hydrogen-rich phase from the contact condenser which is recycled to the reaction zone, the excess being vented from the system under pressure control. The liquid stream from the vapor-liquid separation zone and the liquid stream from the bottom of the contacting-condensation zone are admixed and subjected to fractionation for separation into a gaseous stream containing normally vaporous lower molecular weight hydrocarbons and a stabilized liquid bottoms stream. A portion of the latter is cooled and introduced into the contacting-condensation zone to contact countercurrently the upwardly flowing vapors from the vapor-liquid separation zone. Thus, in accordance with the method of the present invention, and as contrasted to the prior art, all of the net and recycled hydrogen-rich vaporous phase is treated.

Essentially, contact condensing effects a separation of cold gas and relatively hot liquid from a hot mixture thereof. In the prior art processes hereinbefore described, the product liquid is necessarily preheated prior to fractionation as a consequence of effecting complete condensation of the reaction product effluent. Through the utilization of the present invention, total condensation of the liquid, followed by reheating thereof prior to fractionation is significantly reduced. There exists more efficient contacting of vapors with the cooled fractionation zone bottoms material in order to condense and selectively absorb normally gaseous hydrocarbons out of the effluent vapors. The resulting enrichment of the hydrogen stream being recycled to the reaction zone is not obtained through the ue of the prior art techniques, especially in combination with the reduction in overall operational utility costs.

OBJECTS AND EMBODIMENTS

A principal object of our invention is to provide a method for the separation of a hydrogen-containing hydrocarbonaceous reaction zone effluent. A corollary objective resides in a technique for separating a mixed phase reaction product effluent in a manner which decreases the costs of operational utilities.

A specific object of the present invention is directed toward the separation of a hydrogen-containing reaction product effluent while simultaneously recovering an enriched hydrogen recycle stream. Another objective resides in a technique for improving the recovery of desired product.

Therefore, in one embodiment, our invention is directed toward a product effluent separation method for use in a hydrocarbon conversion process wherein (i) a hydrocarbon charge stock and hydrogen are contacted in a catalytic reaction zone, (ii) a hydrogen-containing hydrocarbonaceous effluent stream is withdrawn from said zone, (iii) said effluent is separated to provide a principally liquid phase and a principally vaporous phase, and (iv) at least a portion of said vaporous phase is recycled to said catalytic reaction zone, which method of separating said effluent and increasing the hydrogen concentration of said recycled vaporous phase comprises the steps of: (a) partially condensing said hydrocarbonaceous reaction zone effluent and introducing the same into a vapor-liquid separation zone, therein effecting separation into a first hydrogen-containing vaporous phase and a first liquid phase; (b) introducing said first vaporous phase upwardly into a contacting-condensing zone and therein countercurrently contacting the same with a downwardly flowing, cooled fractionation bottoms material, at contacting conditions selected to effect condensation and selective absorption of a portion of said first vaporous phase; (c) recovering, from said contacting-condensing zone, a second varporous phase enriched in hydrogen and a second liquid phase of said liquid bottoms material and the condensed-absorbed portion of said first vaporous phase; (d) recycling at least a portion of said second vaporous phase to combine with said hydrocarbonaceous charge stock; (e) fractionating a mixture of said first and second liquid phases, in a fractionation zone, at conditions selected to vaporize light components therefrom, and recovering the same as a third vaporous phase; (f) recovering a liquid bottoms material from said fractionation zone; and, (g) cooling said liquid bottoms material and passing at least a portion of the cooled material downwardly into said contacting-condensing zone to countercurrently contact said first vaporous phase therein.

Other embodiments involve preferred operating techniques and ranges of various operating variables. For example, in a specific embodiment, the hydrocarbonaceous reaction zone effluent is cooled and partially condensed at a temperature in the range of about 150°F. to about 300°F., and particularly above about 200°F. In another embodiment, the pressure of the first vaporous phase recovered from the vapor-liquid separation zone is increased prior to the introduction thereof into the lower portion of the contacting-condensing zone.

These, as well as other objects and embodiments of our invention will become evident from the following more detailed description thereof.

SUMMARY OF INVENTION

Briefly, our invention can be summarized as encompassing a reaction zone effluent separation and hydrogen enrichment process in which a hydrogen-containing hydrocarbonaceous reaction zone effluent is cooled and partially condensed at a temperature from about 150°F. to about 300°F. — e.g., 250°F. — and passed into a vapor-liquid separation zone. A first vaporous stream from the vapor-liquid separation zone is introduced into a lower portion of a contacting-condensation zone in which the upflowing vapors contact a descending, cooled fractionation bottoms liquid stream to effect condensation and selective absorption of a portion of the upflowing vapors. There results hydrogen enrichment within the second vaporous phase emanating from the contacting-condensation zone. The first liquid phase from the vapor-liquid separation zone is admixed with the second liquid phase from the contacting-condensation zone, the mixture being introduced into a fractionation facility wherein light gaseous components are readily separated from the normally liquid products. At least a portion of the fractionation bottoms product stream is then cooled and passed into the upper portion of the contacting-condensation zone as the lean liquid intended to partially condense and selectively absorb a portion of the upwardly flowing vaporous phase.

The process of our invention is applicable to any hydrocarbon conversion process wherein a hydrocarbon charge stock and hydrogen are contacted in a catalytic reaction zone. Therefore, our invention may be readily integrated into processes such as catalytic reforming, isomerization, hydrorefining, hydrocracking, hydrodealkylation, dehydrogenation, etc.

Exemplary of the hydrocracking process, into which the present invention can be integrated, are those schemes and techniques found in U.S. Pat. Nos. 3,252,018 (Cl. 208-59), 3,502,572 (Cl. 208-111) and 3,472,758 (Cl. 208-59). The hydrocracking reaction is generally effected at elevated pressures of about 500 to about 5,000 psig., and preferably from 1,500 to about 3,000 psig. Circulating hydrogen is admixed with the charge to the hydrocracking reaction zone in an amount of about 3,000 to about 50,000 scf./Bbl., and more often in the range of about 5,000 to about 20,000 scf./Bbl. The hydrogen and charge stock contacts the catalytic composite, disposed within the hydrocracking reaction zone, at a liquid hourly space velocity of about 0.25 to about 5.0, and preferably from about 0.5 to about 3.0. Since the bulk of the reactions being effected are exothermic in nature, an increasing temperature gradient will be experienced as the charge stock traverses the catalyst bed. The maximum catalyst bed temperature is generally maintained in the range of about 700°F. to about 900°F., and may be controlled through the use of conventional quench streams which are introduced at intermediate loci.

Illustrations of catalytic reforming process schemes are found in U.S. Pat. Nos. 2,905,620 (Cl. 208-65), 3,000,812 (Cl. 208-138) and 3,296,118 (Cl. 208-100). Effective reforming operating conditions include temperatures within the range of about 800°F. to about 1,100°F., and preferably from about 850°F. to about 1,050°F. The liquid hourly space velocity is preferably in the range of about 1.0 to about 5.0, although space velocities from about 0.5 to about 15.0 may be employed. The quantity of hydrogen-rich recycle gas, in admixture with the hydrocarbon feed stock, is generally from about 1.0 to about 20.0 mols of hydrogen per mol of hydrocarbon. Pressures in the range of about 100 to about 1,500 psig. are suitable.

Fixed-bed catalytic isomerization processes are shown in U.S. Pat. Nos. 2,900,425 (Cl. 260–666) and 2,924,628 (Cl. 260 666). The isomerization reaction is preferably effected in a hydrogen atmosphere utilizing sufficient hydrogen so that the hydrogen to hydrocarbon mol ratio in the reaction zone feed will be within the range of about 0.25 to about 10.0. Operating conditions will further include temperatures ranging from about 100°C. to about 300°C. (212°F. to 572°F.), although temperatures within the more limited range of about 150°C. to about 275°C. (302°F. to 527°F.) will generally be utilized. The pressure under which the reaction zone is maintained will range from about 50 to about 1,500 psig. Liquid hourly space velocities will be maintained within the range of about 0.25 to about 10.0, and preferably within the range of about 0.5 to about 5.0.

The preferred construction of the contacting-condensation zone constitutes a vertically positioned and elongated vessel having its longitudinal axis vertically aligned. The preferred operation of this zone constitutes passing a portion, or all of the vaporous material removed from the vapor-liquid separation zone into a lower portion and contacting the upflowing vapors with a descending cooled bottoms stream from the fractionation zone. The downflowing liquid cools, condenses and selectively absorbs a portion of the upflowing vapors. A hydrogen-enriched gaseous phase is removed from an upper portion of the contacting-condensation zone. The condensed-absorbed vaporous material, together with the descending liquid bottoms material, is removed from the contacting-condensation zone at a lower portion thereof. The contacting-condensation zone preferably contains suitably designed contacting material such as saddles, helical coils, or suitably designed trays which effect intimate contact of upflowing vapors with the descending cooled liquid fractionation bottoms material. The location of the various input and output streams of the contacting-condensing zone are such that a vaporous phase is removed from the uppermost portion of this zone. At a lower portion of the contacting-condensation zone, a liquid stream comprising condensed-absorbed upflowing vapors and the descending fractionating bottoms liquid are removed. At a lower portion of the contacting zone, above the liquid draw-off locus, is located the incoming vaporous stream from the vapor-liquid separation zone. Located above the vapor inlet stream, and below the gaseous outlet stream, is the lean liquid input stream which typically carries cooled fractionation zone bottoms material into the contacting zone.

The catalytic conversion zone can be of any suitable construction and design, since this particular unit is not essential to a complete understanding of the present invention. This pertains also to the design and construction of the fractionation zone which will typically comprise a distillation column or similar type apparatus which effects the separation of the mixed-phase feed into light molecular weight, normally gaseous hydrocarbons and normally liquid bottoms material. When the present invention is utilized in a catalytic reforming process, the fractionation zone will function as a stabilizer, with butanes and lighter components being removed from an upper portion of the column as a principally vaporous phase, and pentanes and heavier normally liquid components recovered from a bottom portion thereof.

The vapor-liquid separation zone is essentially a vessel capable of relatively rapid separation of vapors from liquids. This vessel may be a simple design having an input conduit for the reaction zone effluent located between an upper vaporous outlet conduit and a lower liquid withdrawal conduit. It is contemplated that, in some instances, this vessel may contain internal heating and/or cooling means depending upon the type of material charged thereto and the degree of separation desired.

Either a portion of all of the fractionation zone liquid bottoms material may be cooled prior to recovery or utilization in the contacting-condensation zone. In one embodiment, all of the fractionation zone liquid bottoms is passed through a heat exchanger to be cooled. A portion of the cooled fractionation zone bottoms material is then introduced into the upper portion of the contacting-condensation zone to countercurrently contact therein the upwardly flowing vaporous phase. The result of this operation is an enriched hydrogen stream withdrawn from an upper portion of the contacting-condensation zone. Separate heat exchangers may be utilized on the liquid bottoms stream from the fractionation zone. In these situations, it may be desired to slightly cool, or more extensively cool the fractionation zone liquid bottoms stream which is transported to product recovery. The liquid passing from the bottom of the fractionation zone into the contacting-condensation zone may not be cooled as much as the product material, or, in other situations, it may be desired that the same be cooled to a lower temperature than the product material. Therefore, the use of separate heat exchanger services is contemplated in this section of our process.

Preferably, the hydrocarbonaceous charge stock, prior to passing through the conversion zone, is exchanged both against the fractionation zone liquid bottoms material and the effluent material from the conversion zone. In many situations, a feed preheater will be necessary where the use of the two exchangers does not increase the temperature of the feed sufficiently. In other situations, the charge stock may be heat exchanged against the conversion zone effluent material only, with a fractionation zone liquid bottoms material exchanged against other process streams to effect the cooling thereof.

DESCRIPTION OF DRAWING

The accompanying drawing illustrates several embodiments of the reaction zone effluent separation and hydrogen enrichment process encompassed by the present invention. The drawing is presented for the sole purpose of illustration, and is not intended to limit the invention beyond the scope and spirit of the appended claims. Various valves, condensers, pumps, coolers, knock-out pots, reflux condensers, controllers, etc., have been eliminated as not being essential to a complete understanding. The use of such miscellaneous appurtenances will become evident to those possessing the requisite expertise in the art. The drawing will be described in conjunction with a commercially-scaled catalytic reforming process for the conversion of about 16,000 Bbl./day of a naphtha fraction having an API gravity of 56.8 and a molecular weight of about 111.4.

Although illustrated as a single vessel, catalytic reforming zone 1 is a multiple stage system with suitable interheaters between stages. The hydrocarbonaceous charge stock and hydrogen is introduced into the first stage of conversion zone 1 at a temperature of about 1,020°F. and a pressure of about 181 psig. The hydrocarbonaceous reaction zone effluent is withdrawn from the last stage by way of line 18, at a temperature of about 1,009°F. and a pressure of about 145 psig., and is introduced thereby into combined feed heat exchanger 5, the result being a cooling and partial condensation of the effluent at a temperature of about 250°F., accompanied by a heating of the combined feed stream passing through line 11. The cooled and partially condensed reaction product effluent is introduced via line 18 into separation zone 2 at a pressure of about 139 psig.

Vapor-liquid separation zone 2 effects a preliminary separation of the effluent passing thereto via line 18, into a vapor stream which is removed via line 19 and a first liquid stream which is removed via line 17. The vaporous stream is introduced into compressor 7 to be increased to a pressure of about 199 psig. and a temperature of about 320°F., the compressed stream being introduced via line 20 into contacting-condensation zone 3.

Contacting-condensation zone 3 effects intimate contact of upflowing vaporous materials passing through line 20 with a descending stream of a cooled fractionation zone liquid bottoms stream which is introduced into the upper portion of the contacting-condensation zone via line 21 at a temperature of about 100°F. The downflowing liquids contact upflowing vapors effecting cooling, condensation and selective absorption to render a gaseous material removed from contacting-condensation zone 3 via line 27, which vaporous stream is substantially enriched in hydrogen. Generally, the vaporous material in line 27 is introduced into other processes integrated within the overall refinery via line 14. The remaining portion of the gaseous material in line 27 passes through line 13 to be intimately admixed with the charge stock being introduced by way of line 12. The resultant combined feed then passes through line 11 and eventually into catalytic reforming zone 1.

A first liquid stream is withdrawn from vapor-liquid separation zone 2 via line 17 at a temperature of about 250°F. and a pressure of about 139 psig. The pressure of the stream in line 17 is increased via pump 8 to a level of about 260 psig. A second liquid phase, comprising the condensed-absorbed portion of the vapors passing into contacting zone 3 together with the descending liquid material introducted into contacting zone 3 via line 21, is recovered from a lower portion of the contacting zone via line 15. This second liquid phase passes through pump 9 to effect an increase in pressure from about 199 psig. to about 260 psig., after which it is admixed with the first liquid phase in line 17, the mixture passing via line 16 into fractionation zone 4.

A light gaseous stream is recovered from fractionation zone 4 by way of line 25 and comprises about 84.3 mol.% $C_1$-$C_4$ hydrocarbons. A fractionation zone liquid bottoms material is removed from the lower portion of the fractionation zone via line 23, being introduced thereby into heat exchanger 6 wherein it is cooled to a temperature of about 100°F. Products from the lower portion of fractionation zone 6 are recovered at a desired rate via line 22, and introduced thereby into a product receiving tank. The remaining portion of the fractionation zone bottoms liquid material passes via line 21 to the upper portion of contacting-condensation zone 3.

Heat exchangers 5 and 6 may be used to preheat the feed stock passing into hydrocarbon conversion zone 1. In those situations in which the heat recovered from both heat exchangers is not sufficient to increase the temperature of the feed stream to the desired reaction zone temperature, optional feed heater 10 may be utilized. Increasing the pressure of the vaporous phase in line 19, via compressor 7, is preferred in order to decrease the size of both the contacting-condensation zone and fractionation zone as a result of the increased pressure and substantially reduce superficial velocities of the gaseous phases, and further in order that the amount of liquid flowing in stream 21 can be minimized when effecting a target hydrogen purity in line 27 as a result of the greater condensation and absorption of vaporous hydrocarbons in line 20.

Additional data, with respect to the operation of the vapor-liquid separation zone and the contacting-condensation zone as above-described, are presented in the following Tables I and II:

TABLE I

| Component | LINE NO. | | | |
|---|---|---|---|---|
| | 17 | 18 | 19 | 20 |
| $H_2O$ | — | 0.08 | 0.07 | 0.07 |
| $H_2S$ | — | 0.02 | 0.01 | 0.01 |
| $H_2$ | 4.04 | 3671.50 | 3667.46 | 3667.46 |
| Methane | 1.29 | 310.92 | 309.62 | 309.62 |
| Ethane | 3.02 | 234.66 | 231.64 | 231.64 |
| Propane | 6.28 | 184.68 | 178.41 | 178.41 |
| $iC_4$ | 3.48 | 57.51 | 54.03 | 54.03 |
| $nC_4$ | 6.74 | 92.58 | 85.84 | 85.84 |
| $iC_5$ | 10.42 | 83.15 | 72.73 | 72.73 |
| $nC_5$ | 7.49 | 53.52 | 46.04 | 46.04 |
| $C_6+$ Product | 859.78 | 1455.02 | 595.22 | 595.22 |
| TOTAL | 902.55 | 6143.59 | 5241.04 | 5241.04 |
| lb./hr. | 94,403 | 192,639 | 98,236 | 98,236 |
| Mol. Wt. | 104.6 | 31.4 | 18.7 | 18.7 |
| BPSD | 7497.5 | — | — | — |
| °API Gravity | 32.5 | — | — | — |
| MM SCFD | — | — | 47.73 | 47.73 |
| Temp. (°F.) | 250 | 250 | 250 | 320 |
| Pres. (psig.) | 139 | 139 | 139 | 199 |

TABLE II

| Component | LINE NO. | | | | | | |
|---|---|---|---|---|---|---|---|
| | 14 | 15 | 16 | 21 | 23 | 25 | 27 |
| $H_2O$ | 0.03 | 0.01 | 0.01 | — | — | 0.01 | 0.06 |
| $H_2S$ | 0.01 | — | — | — | — | — | 0.01 |
| $H_2$ | 2065.22 | 27.85 | 31.89 | — | — | 31.89 | 3639.60 |
| Methane | 169.73 | 10.49 | 11.79 | — | — | 11.79 | 299.13 |
| Ethane | 115.72 | 27.67 | 30.70 | — | — | 30.70 | 203.96 |
| Propane | 66.39 | 61.36 | 67.64 | — | — | 67.64 | 117.04 |
| $iC_4$ | 10.90 | 34.80 | 38.28 | — | — | 38.28 | 19.22 |
| $nC_4$ | 24.83 | 76.45 | 83.19 | 34.40 | 48.84 | 34.35 | 43.18 |
| $iC_5$ | 21.35 | 139.87 | 150.29 | 104.86 | 148.88 | 1.41 | 37.66 |
| $nC_5$ | 11.84 | 100.97 | 108.44 | 75.85 | 107.70 | 0.76 | 20.88 |
| $C_6+$ Product | 57.25 | 3718.98 | 4578.75 | 3224.74 | 4578.76 | — | 100.98 |
| TOTAL | 2543.25 | 4198.46 | 5101.01 | 3439.85 | 4884.18 | 216.84 | 4482.31 |
| lb./hr. | 22,578 | 402,135 | 496,538 | 343,691 | 488,001 | 8,537 | 39,806 |
| Mol. Wt. | 8.9 | 95.8 | 97.3 | 99.9 | 99.9 | 39.4 | 8.9 |
| BPSD | — | 34229.5 | 41727.0 | 28568.2 | 40563.5 | — | — |
| °API Gravity | — | 44.2 | 42.0 | 40.1 | 40.1 | — | — |
| MM SCFD | 23.16 | — | — | — | — | 1.97 | 40.82 |
| Temp. (°F.) | 132.3 | 220.7 | 220.7 | 100.0 | 481.4 | 144.0 | 132.4 |
| Pres. (psig.) | 195 | 199 | 260 | 195 | 260 | 250 | 195 |

From the foregoing tabulated data, it will be noted that the concentration of hydrogen and the first vaporous phase in line 19 is about 69.98 mol.%, which is comparable to the approximate 67.0 mol.% experienced in prior art processes wherein virtually complete cooling and condensation of the reaction product effluent is effected in a vapor-liquid separation zone. The composition of the enriched hydrogen recycled gaseous stream in line 13 is identical to that recovered from contacting-condensing zone 3 via line 27, and indicates that the hydrogen content is about 81.20 mol.%. Additionally, with respect to the utility cost involved with the fractionation zone, the incorporation of our separation method affords a reduction of about 10.0% to about 15.0%, the precise degree depending primarily upon the charge stock characteristics, the desired hydrogen concentration of the recycled gaseous phase and the intended product slate from fractionation zone 4.

We claim as our invention:

1. In a hydrocarbon conversion process wherein (1) a hydrocarbon charge stock and hydrogen are contacted in a catalytic reaction zone, (2) a hydrogen-containing hydrocarbon effluent stream is withdrawn from said zone, (3) said effluent is separated to provide a principally liquid phase and a principally vaporous phase, and (4) at least a portion of said vaporous phase is recycled to said reaction zone, the improvement comprising separating said effluent and increasing the hydrogen concentration of said recycled vaporous phase by the steps of:

a. partially condensing said hydrocarbon reaction zone effluent at a temperature from about 150°F to about 300°F and introducing the same into a vapor-liquid separation zone, therein effecting separation into a first hydrogen-containing vaporous phase and a first liquid phase;

b. introducing said first vaporous phase upwardly into a contacting-condensing zone and therein countercurrently contacting the same with a downwardly flowing, cooled fractionation bottoms material, at contacting conditions selected to effect condensation and selective absorption of a portion of said first vaporous phase;

c. recovering, from said contacting-condensing zone, a second vaporous phase enriched in hydrogen and a second liquid phase of said liquid bottoms material and the condensed-absorbed portion of said first vaporous phase;

d. recycling at least a portion of said second varporous phase to combine with said hydrocarbon charge stock;

e. fractionating a mixture of said first and second liquid phases, in a fractionation zone, at conditions selected to vaporize light components therefrom, and recovering the same as a third vaporous phase;

f. recovering a liquid bottoms material from said fractionation zone; and, g. cooling said liquid bottoms material and passing at least a portion of the cooled material downwardly into said contacting-condensing zone to countercurrently contact said first vaporous phase therein.

2. The method of claim 1 further characterized in that said first vaporous phase is compressed prior to the introduction thereof into said contacting-condensing zone.

3. The method of claim 1 further characterized in that said first liquid phase is increased in pressure prior to the introduction thereof into said fractionation zone.

4. The method of claim 1 further characterized in that said second liquid phase is increased in pressure prior to the introduction thereof into said fractionation zone.

5. The method of claim 1 further characterized in that said liquid bottoms material is cooled via indirect heat-exchange with said charge stock.

6. The method of claim 1 further characterized in that said hydrocarbon effluent is cooled prior to the introduction thereof into said vapor-liquid separation zone.

7. The method of claim 1 further characterized in that said hydrocarbon effluent is a catalytically reformed naphtha fraction containing hydrogen, normally vaporous hydrocarbons and normally liquid hydrocarbons.

* * * * *